May 5, 1959  F. C. MURRAY  2,884,797
TRANSMISSION BELT
Filed Aug. 8, 1955

INVENTOR.
FRANKLIN C. MURRAY
BY
ATTORNEYS

United States Patent Office 2,884,797
Patented May 5, 1959

2,884,797

TRANSMISSION BELT

Franklin C. Murray, Detroit, Mich.

Application August 8, 1955, Serial No. 526,809

6 Claims. (Cl. 74—233)

The invention relates to transmission belts and more particularly to V-belts for automotive V-belt drives.

The principal object of the invention is to obtain a V-belt of vastly improved life and efficiency by providing a cooler running belt having better distribution of stresses throughout the cross-section of the belt.

This result is obtained by providing a groove throughout the inner circumference of the endless belt extending from the inner surface toward the outer surface for a substantial distance. The groove is so constructed and arranged as to perform many beneficial functions as hereinafter more fully set forth, but in particular it has the important effect of increasing heat dissipation and consequently decreasing the belt temperature under load.

Other features and advantages of my invention will become apparent during the ensuing detailed description of a transmission belt made in accordance with the invention.

Figure 1:
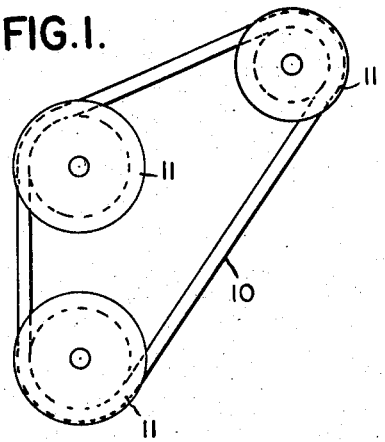
Fig. 1 illustrates an automotive V-belt drive utilizing my invention.

In Fig. 1 I have illustrated a conventional automotive V-belt drive in which an endless belt 10 engages the pulleys 11. Ordinarily the V-belt for such a drive is made in accordance with S.A.E. standards and recommended practice as to groove angle, dimensions, tolerances, etc. My improved belt is constructed to follow the general standards when engaging the pulleys but is provided with a cut-out portion or groove which changes the side angles and the dimensions of the belt when in repose and not under load and also causes the belt to change in cross-sectional configuration while intermediate the pulleys and under load.

Figure 2:
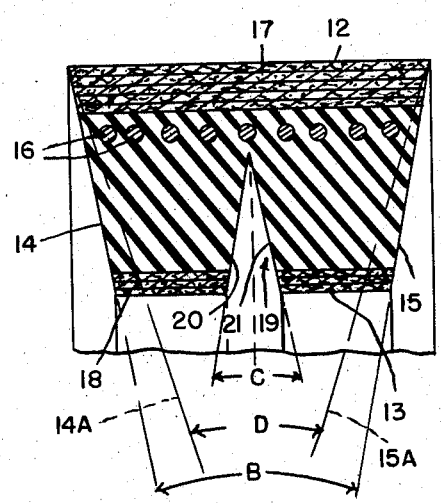
Fig. 2 is a cross-section through the belt when not under load.
Figure 3:
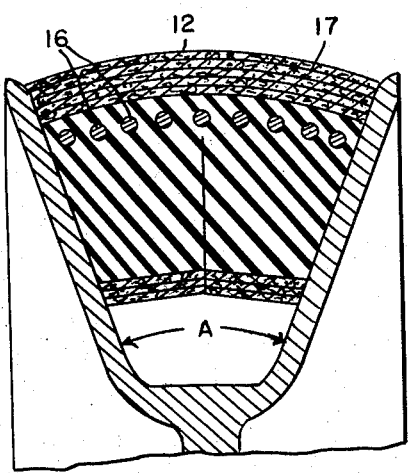
Fig. 3 is a cross-section through the belt while engaging a pulley but substantially free from load.

Fig. 2 shows the normal cross-section of the belt when not under load. The outer and inner circumferential surfaces 12 and 13 respectively are parallel and connected by the side surfaces 14 and 15, forming an angle B which is smaller than the groove angle A of the pulley (Fig. 3). The peripheral section of the belt is preferably provided with the standard reinforcing elements such as the cords 16 and layers or strips 17 in accordance with conventional practice. The inner surface of the belt is also provided with layers or strips 18 and the body of the belt is of vulcanized rubber or other suitable material.

A circumferential groove 19 is provided in the belt, forming sides 20 and 21 which in cross-section are in the shape of an inverted V, the apex of which extends toward the outer circumferential surface for a substantial distance. The groove normally extends for at least one-half the thickness of the belt to a point adjacent the cords 16. The angle C of the V-shaped groove in the belt is selected so that if the outer sides 14 and 15 of the belt are compressed to the groove angle of the pulley, the boundary surfaces 20 and 21 of the groove are brought together into coincidence in a common plane and the side surfaces 14 and 15 are thereby moved into the positions shown by dotted lines 14A and 15A. The deformed grooved belt is thus equivalent to an ungrooved solid belt of belt angle D. This relationship may be expressed by the equation $$B+C=D$$

Thus a belt constructed with the V notch in accordance with my invention can conform with the groove angle of the pulley when the belt engages the pulley. Those portions of the belt which are not in contact with the pulley retain the notched configuration. Thus when the belt engages a pulley, the groove is closed but as soon as the belt leaves the pulley the groove opens again. This opening of the groove during the travel of the belt from pulley to pulley is an important factor in causing the belt to run cooler under load and thus increase its useful life.

Another advantage of the grooved belt is illustrated in Fig. 3. The engagement of the sides of the belt with the sides of the pulley not only causes the inner surface 20 and 21 to close the groove but also causes the periphery of the belt to become convex in cross-section.

Figure 4:
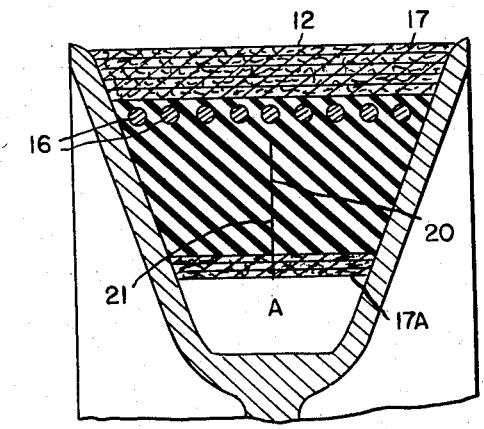
Fig. 4 is a view similar to Fig. 3 when the belt is under load.

When the load for which the V-belt drive is designed is placed on the belt, the belt assumes the cross-sectional shape illustrated in Fig. 4, with the cords 16 and the outer surface of the belt each in a substantially straight line similar to that illustrated in Fig. 2. This change in configuration is due to the fact that in V-belt drives there is no support for the bottom of the belt and the tension caused by the load forces the central portions of the belt inwardly and permits the cords 16 as well as the fabric layers 17 and 17A to change from a convex to a straight line position.

The conventional V-belt when under load has its central portions drawn inwardly, thereby causing the belt to assume a concave shape in cross-section, with the result that the center cords do not take their full share of the load. My invention overcomes this disadvantage and provides a belt in which the tension on the cords is more nearly uniform under conditions of maximum or optimum load.

In V-belt drives, it is quite common to make the groove angle A for the pulleys 36 degrees. The belt angle is usually slightly greater and within the range of 38 to 44 degrees. A belt for such a drive made in accordance with my invention may have, for example, a normal angle B between the sides 14 and 15 of 18° to 24° and a groove angle C of 20°. This gives an effective belt angle D of 38° to 44°. However, my invention contemplates other angular relationships in which the effective belt angle D (which is the sum of angles B and C) is equal to or greater than the pulley angle A. For example, a belt with parallel sides 14 and 15 ($B=0$) can be used if the V-notch has a wider angle C equal to or greater than the angle A of the pulley. Thus, a V-notch angle of 36° in a belt with parallel sides will give an effective belt angle D of 36° while a still wider V-notch angle will give a larger effective belt angle. Various combinations of the angles $B+C$ may be used to provide the desired effective belt angle D in predetermined relation to the pulley angle A. Preferably the angles are chosen to cause such a convex shape under minimum load conditions (Fig. 3) as will give a substantially straight line arrangement of cords under maximum or optimum load conditions (Fig. 4).

A belt according to my invention may be manufactured in accordance with conventional methods and may be either a cut belt, a wrapped belt, or any other suitable type. Belts are ordinarily built up on drums and vulcanized or otherwise heat cured at least partially while on the drums. The cut belts are completely cured and then cut to the desired side angles, while wrapped belts are partially cured on the drums, then individually cut off, wrapped with fabric and placed in a ring mold to complete the bonding. In either case, after the belt is completed, it may be turned inside out and placed on a revolving form to permit cutting of the V-groove 19. Alternately, the groove may be molded into the belt prior to vulcanization.

When my new notched belt operates in a V-belt drive, the groove 19 is closed while the belt engages the pulley, opens after it leaves the groove of the pulley, and closes again when it is confined with the groove of the next pulley. Thus during the operation, the belt continues to open and close with a "breathing" action. When operating under optimum or maximum load, the engagement of the belt with the pulley groove tends to stretch the center cords so that each cord takes an equal amount of the load, avoiding overstressing of a portion only of the cords.

From the above it will be seen that the improved belt of my invention operates at a lower temperature under load, not only because of the breathing action but because of the uniform distribution of the stresses due to the unique construction and arrangement as herein described.

What I claim as my invention is:

1. In a belt drive, the combination with a pulley having a V-groove of predetermined angle, of an endless belt engaging said grooved pulley having side faces normally forming an angle substantially smaller than the angle of the V-groove in said pulley, said belt having reinforcing cords in the outer peripheral section thereof, said belt also having a V-slot extending into said belt from the inner surface toward the outer surface for a distance more than half the thickness of the belt to a point adjacent the reinforcing cords, said V-slot dividing the belt into a plurality of portions capable of flexing toward each other and providing surfaces capable of contact with each other thereby closing the groove when the belt engages said grooved pulley.

2. In a belt drive, the combination with a pulley having a V-groove of predetermined angle, of an endless belt engaging said grooved pulley having side faces normally forming an angle substantially smaller than the angle of the V-groove in said pulley, said belt having an inverted V-slot extending from the inner surface toward the outer surface for a distance more than half the thickness of the belt, said groove dividing the belt into a plurality of portions capable of flexing toward each other and providing surfaces capable of contact with each other when the side faces engage the groove in the pulley, thereby closing said V-slot, said belt having reinforcing tension elements in the peripheral section thereof on the outer side of said V-slot.

3. In a belt drive, the combination with a pulley having a V-groove of predetermined angle, of an endless belt engaging said grooved pulley having side faces normally forming an angle substantially smaller than the angle of the V-groove in said pulley, said belt having reinforcing cords in the neutral section of the belt in the outer peripheral section thereof, said belt also having a V-slot extending into said belt from the inner surface toward the outer surface to a point adjacent the reinforcing cords, said V-slot dividing the belt into a plurality of portions capable of flexing toward each other and providing surfaces capable of contact with each other thereby closing the groove when the belt engages said grooved pulley.

4. In a belt drive, the combination according to claim 3, in which the sum of the angle formed by said side faces and the angle of said V-slot is equal to an angle slightly greater than the angle of the V-groove of said pulley.

5. In a belt drive, the combination according to claim 3, in which the angle of the V-groove in said pulley is approximately 36° and the sum of the angle formed by said side faces and the angle of said V-slot is equal to an angle between 38° and 44°.

6. In a belt drive, the combination according to claim 3 in which the angle of the V-groove in said pulley is approximately 36°, the normal angle between the side faces of the belt is between 18° and 24° and the angle of said V-slot is approximately 20°, thereby giving an effective belt angle when said V-slot is closed between 38° and 44°.

References Cited in the file of this patent

UNITED STATES PATENTS

| | | |
|---|---|---|
| 2,023,421 | Heyer | Dec. 10, 1935 |
| 2,056,844 | Farrand | Oct. 6, 1936 |
| 2,214,098 | Carlson | Sept. 10, 1940 |
| 2,471,969 | Meyer | May 31, 1949 |
| 2,540,245 | Dean | Feb. 6, 1951 |
| 2,645,132 | Fuchslocher | July 14, 1953 |

FOREIGN PATENTS

| | | |
|---|---|---|
| 253,867 | Germany | Nov. 16, 1912 |
| 627,901 | Great Britain | Aug. 18, 1949 |